US008737452B2

(12) United States Patent
Mia

(10) Patent No.: US 8,737,452 B2
(45) Date of Patent: May 27, 2014

(54) IDENTIFICATION AND ISOLATION OF RADIO SIGNALS FOR A WIRELESS LOCATION SYSTEM

(75) Inventor: Rashidus S. Mia, Phoenixville, PA (US)

(73) Assignee: TruePosition, Inc., Berwyn, PA (US)

(*) Notice: Subject to any disclaimer, the term of this patent is extended or adjusted under 35 U.S.C. 154(b) by 0 days.

(21) Appl. No.: 13/527,289

(22) Filed: Jun. 19, 2012

(65) Prior Publication Data
US 2013/0336366 A1 Dec. 19, 2013

(51) Int. Cl.
H04B 1/00 (2006.01)
H04B 7/216 (2006.01)
H04W 4/00 (2009.01)

(52) U.S. Cl.
USPC .......................... 375/148; 370/342; 370/332

(58) Field of Classification Search
USPC ................................ 375/148; 370/342, 332
See application file for complete search history.

(56) References Cited

U.S. PATENT DOCUMENTS

| 5,327,144 | A | 7/1994 | Stilp et al. | |
|---|---|---|---|---|
| 5,608,410 | A | 3/1997 | Stilp et al. | |
| 5,959,580 | A | 9/1999 | Maloney et al. | |
| 6,009,091 | A * | 12/1999 | Stewart et al. | 370/342 |
| 6,047,192 | A | 4/2000 | Maloney et al. | |
| 6,526,065 | B1 * | 2/2003 | Cheng | 370/441 |
| 6,782,264 | B2 | 8/2004 | Anderson | |
| 7,167,713 | B2 | 1/2007 | Anderson | |
| 7,340,259 | B2 | 3/2008 | Maloney et al. | |
| 2002/0114294 | A1 * | 8/2002 | Toskala et al. | 370/329 |
| 2002/0131483 | A1 * | 9/2002 | Papasakellariou | 375/148 |
| 2003/0045288 | A1 * | 3/2003 | Luschi et al. | 455/434 |
| 2003/0081562 | A1 * | 5/2003 | Iwamatsu et al. | 370/314 |
| 2003/0095532 | A1 * | 5/2003 | Kim et al. | 370/342 |
| 2003/0193913 | A1 * | 10/2003 | Murata et al. | 370/332 |
| 2010/0034114 | A1 * | 2/2010 | Kim et al. | 370/252 |
| 2011/0159891 | A1 * | 6/2011 | Segall et al. | 455/456.3 |

OTHER PUBLICATIONS

3rd Generation Partnership Project (3GPP), TR 45.811, V6.0.0, "3rd Generation Partnership Project; Technical Specification Group GSM/EDGE Radio Access Network; Feasability Study on Uplink TDOA in GSM and GPRS (Release 6)", Jun. 2002, 73 pages.
3rd Generation Partnership Project (3GPP), TS 25.305, V7.1.0, "3rd Generation Partnership Project; Technical Specification Group Radio Access Network; Stage 2 functional specification of User Equipment (UE) positioning in UTRAN (Release 7)", Sep. 2005, 75 pages.
U.S. Appl. No. 11/150,414, filed Jun. 10, 2005, Anderson.
U.S. Appl. No. 11/533,310, filed Sep. 19, 2006, Ward.

* cited by examiner

*Primary Examiner* — Leon-Viet Nguyen
*Assistant Examiner* — Sarah Hassan
(74) *Attorney, Agent, or Firm* — Baker & Hostetler LLP

(57) ABSTRACT

In an overlay, network-based, Wireless Location System, LMUs typically co-located with BTSs, are used to collect uplink radio signaling for use in TOA, TDOA and/or AoA positioning methods. In a UMTS, the dual nature of the uplink allows for identification of the correct uplink signal even in the presence of co-channel interference from other UMTS mobile devices.

17 Claims, 4 Drawing Sheets

IDENTIFICATION AND ISOLATION OF RADIO SIGNALS FOR A WIRELESS LOCATION SYSTEM

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates the identification and isolation of radio signals-of-interest from a mobile device by an uplink wireless location system.

BACKGROUND

As discussed in the applicant's (TruePosition's) submission to the $3^{rd}$ Generation Partnership program (in 3GPP TR 45.811 R6) and again in the UMTS UE location standard (e.g. 3GPP TS 25.305 R 7.1.0), uplink time-difference-of-arrival (U-TDOA) is particularly well suited to UMTS due to selection of the Wideband Code Division Multiple Access (W-CDMA) direct sequence spread spectrum radio air interface.

As taught in the well-known Cramer-Rao bound statistical theory, the accuracy of the location estimation is limited by several practical factors such as integration time, signal-to-noise ratio (SNR) at each receiver site, as well as the bandwidth of the transmitted signal. The higher power level (Eb/No) associated with the lower spreading factors of a CDMA-based wireless communications network provides a high level of accuracy because many LMUs can participate in the location effort.

The UMTS WCDMA-based system has an uplink signal (mobile (user equipment (UE)) to base station (NodeB)) that uses a direct sequence spread spectrum and contains two distinct, separate code multiplexed channels so that the cycling of the UE's transmitter power does not cause electromagnetic interference to the audio output(s) of the UE.

The dual uplink channels (dual channel quadrature phase shift keying (QPSK)) are achieved by applying the coded user data to the "I" or In-phase input to the QPSK modulator, and control data which has been encoded using a different code to the "Q" or quadrature input to the modulator. The resulting physical uplink channels are called the Dedicated Physical Data Channel (DPDCH) and the Dedicated Physical Control Channel (DPCCH).

TruePosition's commercially deployed Wireless Location System (WLS) uses geographically distributed receivers called Location Measurement Units (LMUs) deployed as standalone, co-located with the UMTS base station (a Node-B) or integrated into the NodeB. The LMUs are used to collect the uplink radio signal and then the WLS uses TOA, TDOA, AoA, PDOA or a combination of techniques is used to calculate a location for the wireless device.

The inventive techniques and concepts described herein apply to code-division radio communications systems such as the Universal Mobile Telecommunications System (UTMS), which is also known as W-CDMA. The UMTS model discussed above is an exemplary but not exclusive environment in which the present invention may be used.

SUMMARY

In a spread-spectrum wireless communications network, low uplink radio transmission power and high frequency reuse cause co-channel interference making detection and identification of radio signals for use in a wireless location system difficult. Using a two-phase correlation process, the WLS can identify the signal of interest from interfering uplink signals.

An exemplary implementation of the present invention provides a method for identifying a signal-of-interest (SOI). The inventive method comprises receiving the SOI at a reference sensor station, providing a first reference signal based on a first component of the SOI received at the reference sensor station, and providing a second reference signal based on a second component of the SOI received at the reference sensor station. In addition, the a signal comprising the SOI along with an interfering signal is received at a cooperative sensor station. The first reference signal and the second reference signal are correlated (or cross-correlated) with the signal received at the cooperative sensor station. In addition, a first correlation map representing the correlation of the first reference signal with the signal received at the cooperative sensor station is provided, and a second correlation map representing the correlation of the second reference signal with the signal received at the cooperative sensor station is provided. Then, based on the first correlation map, first and second peaks are identified, and, based on the second correlation map, third and fourth peaks are identified. A first value, corresponding to a ratio of the first and third peaks, is identified, and a second value, corresponding to a ratio of the second and fourth peaks, is identified. The first and second values are compared to a third value based on a ratio of predetermined gain factors $\beta c/\beta d$, and the SOI is identified based on the value most closely matching the third value.

In a presently preferred embodiment, the method further comprises determining a time of arrival of the SOI at the cooperative sensor station. In addition, in this preferred embodiment, the SOI includes a user data part and a control data part. For example, the SOI is transmitted by a mobile device over dual uplink channels using a dual channel phase shift keying digital modulation method. In this modulation method, coded user data are applied to an in-phase input of a quadrature phase shift keying (QPSK) modulator and control data are applied to a quadrature-phase input of the QPSK modulator. This results in physical uplink channels including a Dedicated Physical Data Channel (DPDCH) and a Dedicated Physical Control Channel (DPCCH).

In the presently preferred embodiment, the first reference signal, DPDCH REF, is based on the user part component of the SOI received at the reference sensor station, and a second reference signal, DPCCH REF, is based on the control part component of the SOI received at the reference sensor station. In addition, in the preferred embodiment, the reference and cooperative sensor stations each comprise a location measuring unit (LMU).

The present invention also provides a system for identifying a signal-of-interest (SOI). An illustrative embodiment comprises a reference sensor station configured to receive the SOI and to provide a first reference signal based on a first component of the SOI and a second reference signal based on a second component of the SOI. In addition, the system includes a cooperative sensor station configured to receive a signal comprising the SOI along with an interfering signal, and to correlate the first reference signal and the second reference signal with the signal received at the cooperative sensor station. The system also includes means (such as a programmed computer) for identifying the SOI based on a ratio of predetermined gain factors ($\beta c/\beta d$) and the correlations of the first and second reference signals with the signal received at the cooperative sensor station.

The present invention may also be implemented in software stored on a non-transitory computer readable medium. The software comprises instructions for performing a computer-implemented process as summarized above and in the following detailed description. In addition, the disclosed invention may be alternatively embodied in an IS-2000/CDMA-2000 environment. Similar to the W-CDMA scheme used for UMTS, the CDMA-2000 protocol for the uplink radio signal (i.e., the reverse channel) contains a mix of common signaling (the reverse link pilot) and unique signaling (the user data channels). Knowledge of the reverse link pilot and collected user data channel information allows the WLS to cross-correlate the collected signal with the reference signal to isolate and identify the signal from the mobile device of interest. Additional aspects of the inventive technology are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
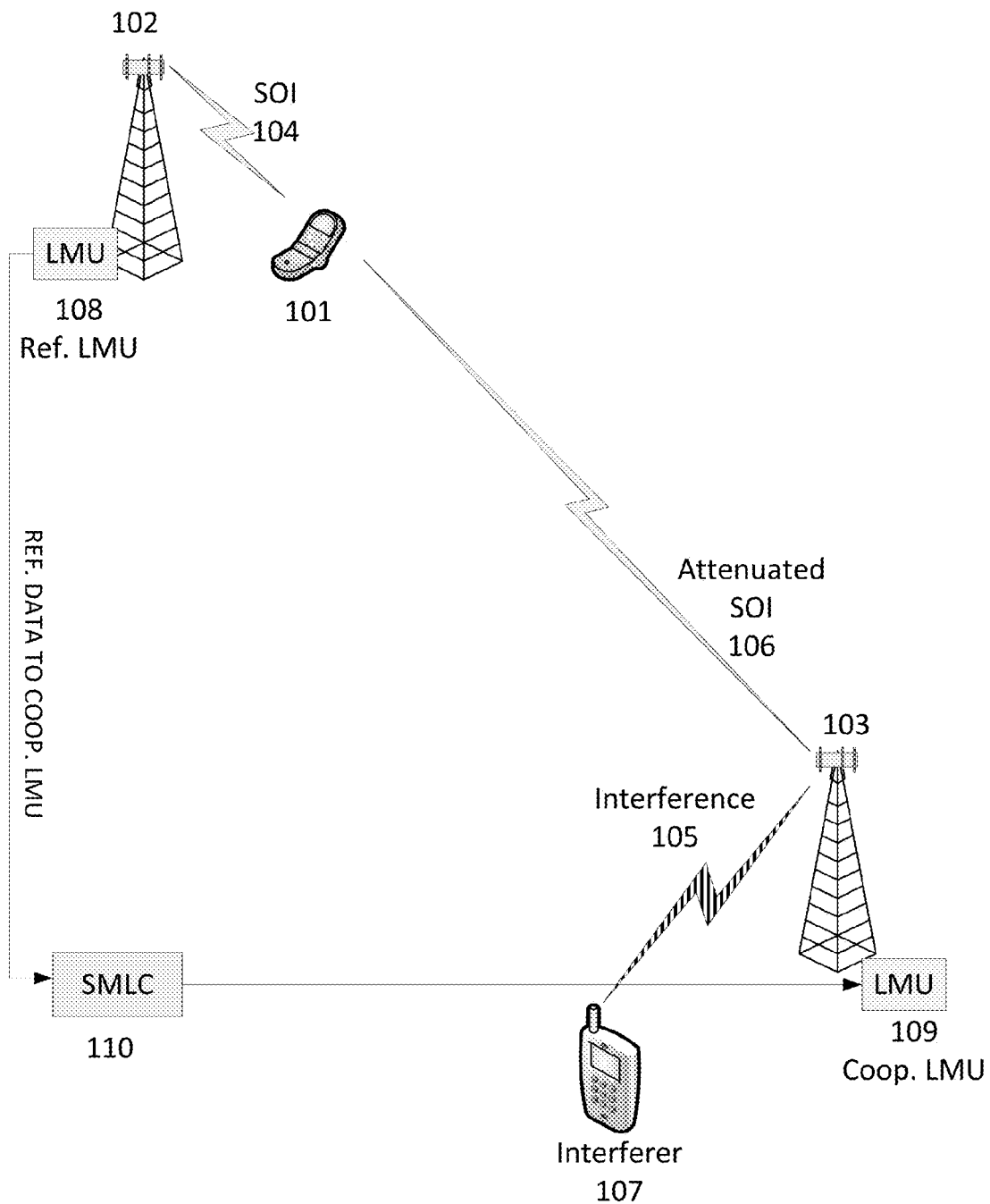
FIG. 1 geographically depicts interference in a CDMA-based wireless location system

We will now describe illustrative embodiments of the present invention. First, we provide a detailed overview of the problem and then a more detailed description of our solutions.

Identification of the true Signal-of-interest (SOI) among interfering mobile uplink signals is of paramount importance for both Time and Angle based wireless location techniques.

To perform a Time-of-arrival or Time-Difference-of-arrival wireless location, the wireless location system (WLS) must be able to determine the time-of-flight of the SOI at multiple, geographically distributed LMU sites. For Angle-of-Arrival systems, determination of the correct signal-of-interest in the radio reuse environment allows for the direction from the measurement of the phase delay at each antenna element to be calculated.

Maximizing the number of radio signal reception sites allows the WLS using TOA, TDOA, AOA or a combination of these techniques to produce more accurate location estimation by elimination of poorly placed sites and/or those with low signal quality.

FIG. 1

The wireless-device-of-interest (target) 101 emits a signal of interest (SOI) 104 which is collected at a first LMU equipped cell site 102. The attenuated SOI 106 is also received at a second LMU equipped cell site 103. The second LMU equipped cell site 103 may be adjacent, proximate or even several cell diameters distant from the first LMU equipped cell site 102. The first LMU equipped cell site 102 is the serving cell or the proxy serving cell (see United States Patent Application #20110159891, "Cooperating Receiver Selection for UMTS Wireless Location", Segal et al. Filed Jun. 30, 2011 for details on serving site selection in a CDMA/W-CDMA wireless location system).

At the second LMU equipped cell site 103, the attenuated SOI 106 is interfered with the second radio signal 105 from a second mobile device (interferer) 107. In W-CDMA based UMTS wireless communication network, the uplink radio SOI 104 106 contains both control information (the Dedicated Physical Control Channel (DPCCH)) and user data (Dedicated Physical Data CHannel (DPDCH)). The first LMU 108 has prior knowledge of the UMTS network and can despread and demodulate the SOI. The reference LMU 108 at the first LMU equipped cell site 102 then sends a signal representation to the co-operator LMU 109 at the second LMU equipped cell site 103 for matched replica processing. Details in matched replica processing can be found in U.S. Pat. No. 6,047,192; Issued Apr. 4, 2000 and U.S. Pat. No. 7,340,259; Issued Mar. 4, 2008, both entitled "Robust Efficient Localization System". As shown, in this example, the reference data, or reference signal representation, is communicated through a serving mobile location center (SMLC) 110 from the reference LMU 108 to the co-operator LMU 109. From the signal representation, the co-operator LMU 109 reconstructs the reference signal which is then cross-correlated with the attenuated and interfered signal collected by the second LMU equipped cell site 103. The signal collected at the second LMU equipped cell site 103 contains both the attenuated signal of interest 106 and the interfering signal 105.

The replica SOI signal can be represented as a quadrature signal:

$$SOI = CREF + i(UREF)$$

Where CREF represents Control Data as encoded in the DPCCH and UREF represents the User Data as encoded in the DPDCH.

Or as the sum of its real and complex components, $$SOI = DPCCH + DPDCH$$

where DPCCH is the real component and DPDCH is the imaginary component.

The correlation processing by the cooperative LMU 109 can be shown as:

$$A = DPCCH_{REF} * [P_L(DPCCH_{SOI} + DPDCH_{SOI}) + (DPCCH_{NT} + DPDCH_{INT})]$$

$$B = DPDCH_{REF} * [P_L(DPCCH_{SOI} + DPDCH_{SOI}) + (DPCCH_{NT} + DPDCH_{INT})]$$

Where $DPCCH_{REF}$ is the reconstructed control part component of the SOI, $DPDCH_{REF}$ is the reconstructed user part component of the SOI, $DPCCH_{SOI}$ is the control part component of the SOI received at the cooperator LMU, $DPDCH_{SOI}$ is the user part component of the SOI received at the cooperator LMU, $DPCCH_{NT}$ is the control signal component of the interferer received at the cooperator LMU, $DPDCH_{INT}$ is the user data signal component of the interferer received at the cooperator LMU, and $P_L$ is the path loss and multipath corruption associated with the radio propagation of the SOI to the second LMU.

The direct cross correlation of the SOI and cooperative signals results in a correlation signal with both the attenuated SOI 106 and Interferer 105 signals. Both contain DPCCH and DPDCH components potentially resulting in an ambiguous location result.

Although shown in FIG. 1 as being distinct and co-located with wireless communications network cell sites, the LMU can also be deployed as standalone with dedicated antenna or integrated into the hardware and software of the base transceiver station. The interference mitigation technique shown in FIG. 1 may be employed alone or in conjunction with other interference mitigation techniques such as those using knowledge of sectors and cell sites drawn from the WCN frequency plan to eliminate interferers.

FIG. 2

Figure 2:
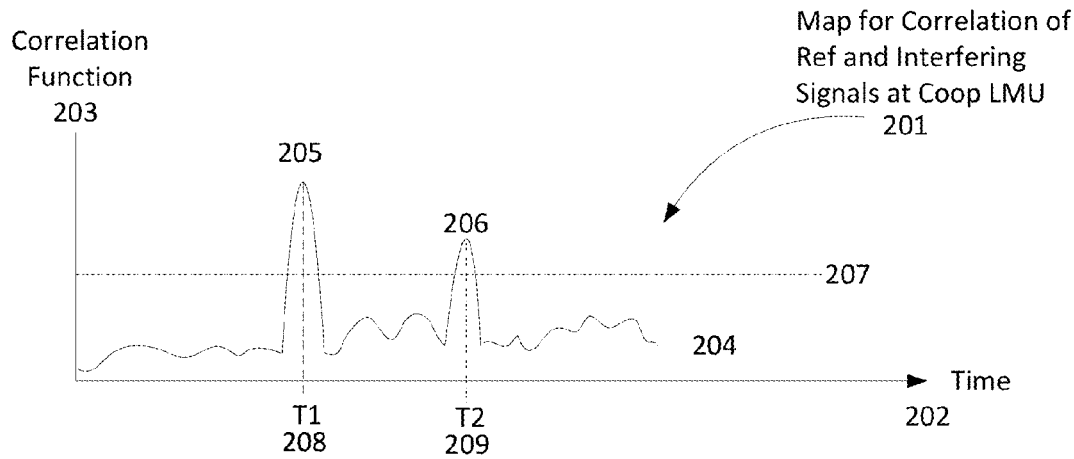
FIG. 2 illustrates the correlation of an interfered signal of interest with the replica signal of interest.

FIG. 2 depicts the cross correlation of the reference signal and an interfered signal collected by a cooperative LMU. The time 202 versus correlation 203 map 201 of the correlation signal 204 is shown at a single frequency for the purposes of clarity. The correlation signal shows two peaks 205 206 over the detection threshold 207. Lack of a single peak correlation value is indicative of an interfering signal from second mobile device. The presence of multiple correlation peaks 205 206 over the detection threshold 207 leads to an ambiguous solution for a TOA, TDOA or hybrid technique wireless location system. The times associated with all peaks are recorded. In this example only two peaks 205 206 are above threshold 207 so only two times; T1 208 and T2 209 are recorded. Once the time-difference-of-arrival timestamp (e.g. T1, T2 . . . . T(n)) for all peaks in the time window over the correlation threshold are recorded, then identification of the true signal of interest can begin as shown in FIGS. 3a and 3b.

FIG. 3a

Figure 3A:
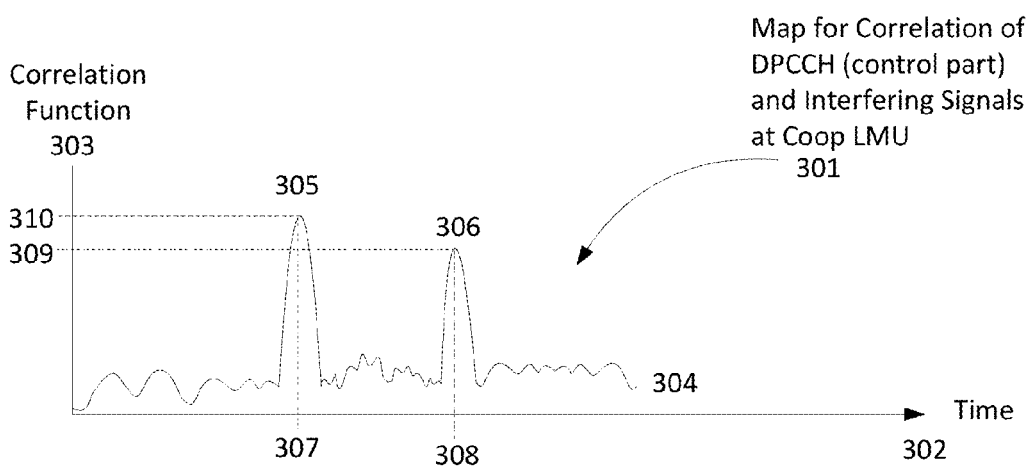
FIG. 3a illustrates the correlation of an interfered signal of interest with the replica DPCCH.
Figure 3B:
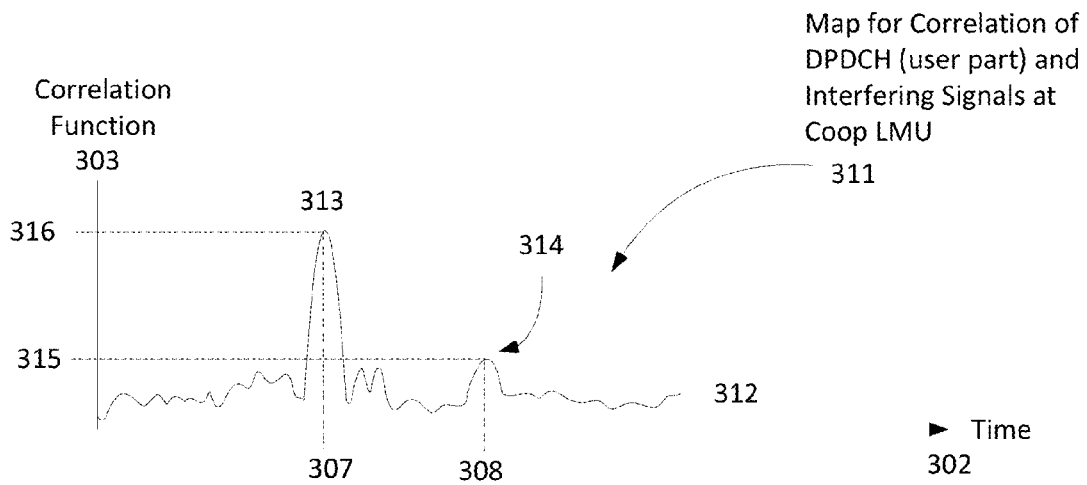
FIG. 3b illustrates the correlation of an interfered signal of interest with the replica DPDCH.

FIG. 3a depicts the cross correlation of the reconstructed DPCCH portion of the reference signal and an interfered signal collected by a cooperative LMU. The time 302 versus correlation 303 map 301 of the DPCCH correlation signal 304 is shown here as at a single adjusted frequency for the purposes of clarity.

The DPCCH correlation signal shows two peaks 305 306 at times 307 308 that match those of the peaks discovered in the cross-correlation depicted in FIG. 2. The lack of a single peak correlation value when correlating only with the reference DPCCH is indicative of an interfering signal from second mobile device. The timing 307 308 and the correlation amplitudes 309 310 are recorded.

FIG. 3b

FIG. 3b depicts the cross correlation of the reconstructed DPDCH portion of the reference signal and an interfered signal collected by a cooperative LMU. The time 302 versus correlation 303 map 311 of the DPDCH correlation signal 312 is shown here as at a single adjusted frequency for the purposes of clarity.

The DPDCH correlation signal shows a first correlation peak 309 at time T1 307 and a second correlation peak 314 at T2 308. Using the calculated correlation for the signal at time T1 and the signal at time T2, an evaluation is performed to determine the SOI versus any interferers. The UMTS network has previously provided the gain factors βd and βc, where βd is the gain setting for the DPDCH and Pc is the gain setting for the DPCCH.

Using the values shown in FIGS. 2, 3a and 3b, reception of a first and second radio signal has been determined at times T1 and T2 respectively. The correlation amplitudes from the DPCCH correlation signal are then divided by the correlation amplitudes from the DPDCH correlation. In other words, the amplitude of DPCCH correlation 310 at T1 307 is divided by the amplitude of the DPDCH correlation 316 at T1 307, and the amplitude of DPCCH correlation 309 at T2 308 is divided by the amplitude of the DPDCH correlation 314 at T1 308. For the SOI, the ratio of the correlation signals will approximate the ratio of βc/βd while, for the interfering signal, the ratio of the correlation signals will be very much greater than the ratio of βc/βd. Having identified the real SOI at the cooperative LMU, the interferer(s) and associated timestamp(s) is then ignored in subsequent location and velocity calculations.

In cases where multiple DPDCH are present in the uplink SOI radio signal and the associated power factors for each (e.g. βd1, βd2, βd3, or βd(n)) are known, the ratio between correlation amplitudes for the SOI can be characterized as:

$$\text{RatioSOI} = \beta c/[(\beta d1)2 + (\beta d2)2 + (\beta d3)2 + \ldots \beta d(n))2]^{1/2}$$

The procedure for identification of the SOI does not vary with the number of DPDCH or the number of interferers.

FIG. 3c

Figure 3C:
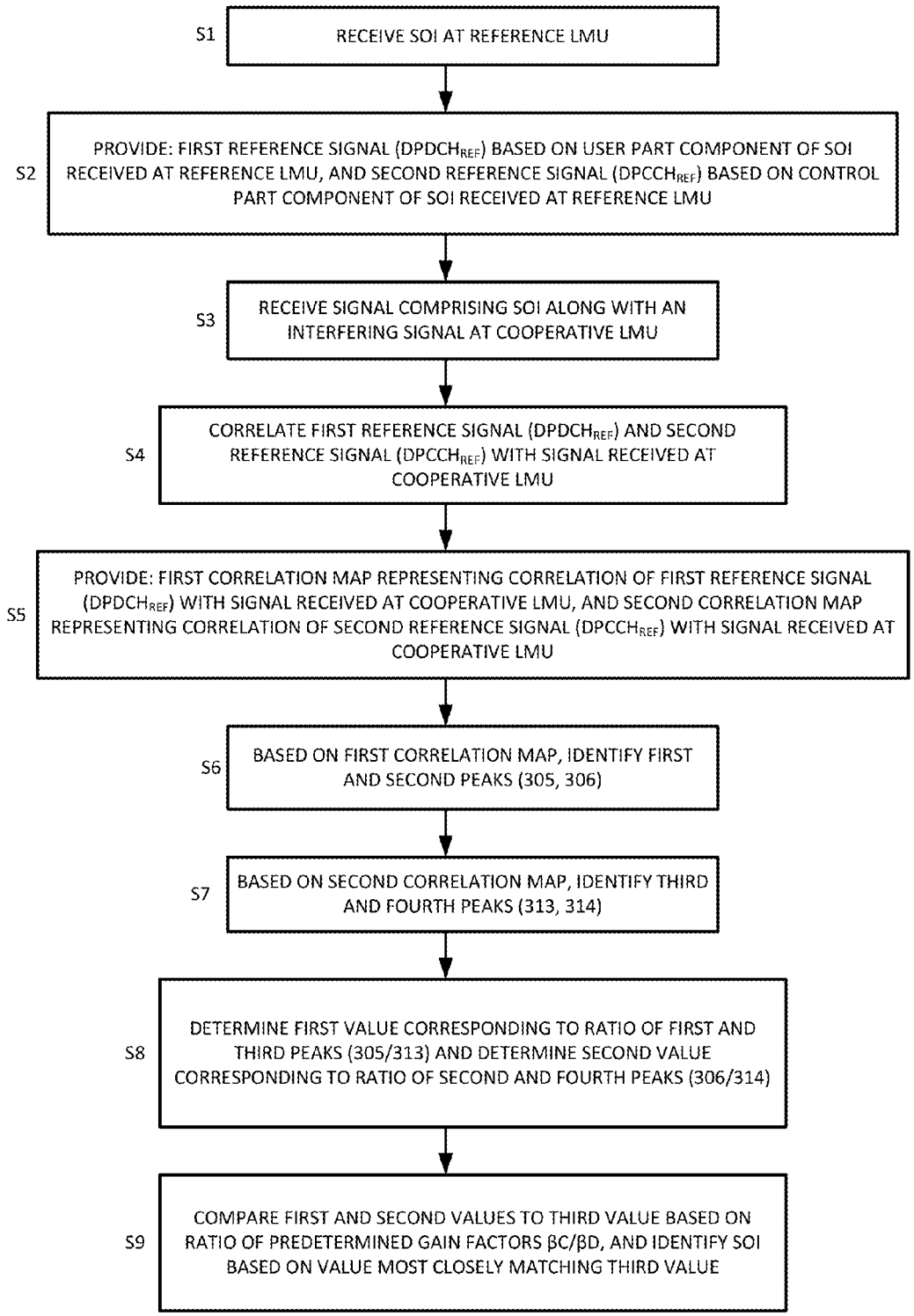
FIG. 3c is a flowchart of an inventive process for identifying and determining the time of arrival of a SOI at a cooperative LMU.

FIG. 3c is a flowchart of an illustrative implementation of the inventive process for identifying and determining the time of arrival of a SOI at a cooperative LMU. As discussed above, this embodiment enables a wireless location system to identify a SOI having a user data part and a control data part. In this example, the SOI is transmitted by a mobile device over dual uplink channels using a dual channel phase shift keying digital modulation method. In particular, coded user data are applied to an in-phase input of a quadrature phase shift keying (QPSK) modulator, and control data are applied to a quadrature-phase input of the QPSK modulator. This modulation scheme results in physical uplink channels including a DPDCH and a DPCCH.

As shown, the process comprises the following steps, S1 through S9. These steps may be carried out in a different order (some steps may be performed simultaneously) than shown, as will be appreciated by one skilled in the art.

S1: The SOI is received at a first, reference location measuring unit (LMU). Per FIG. 1, this is LMU 108.

S2: The reference LMU provides a first reference signal ($\text{DPDCH}_{REF}$) based on the user part component of the SOI and a second reference signal ($\text{DPCCH}_{REF}$) based on the control part component of the SOI.

S3: In addition, as shown in FIG. 1, a signal comprising the SOI along with an interfering signal is received at a second, cooperative LMU. This is LMU 109 in FIG. 1. The interferer is shown as handset 107.

S4: The first reference signal ($\text{DPDCH}_{REF}$) and the second reference signal ($\text{DPCCH}_{REF}$) are correlated with the signal received at the cooperative LMU. In the present example, this correlation is performed at the cooperative LMU. It is also possible to perform the correlation at another location, e.g., at the SMLC 110 (FIG. 1).

S5: As discussed above in connection with FIGS. 3a and 3b, a first correlation map (301—see FIG. 3a) representing the correlation of the first reference signal ($\text{DPDCH}_{REF}$) with the signal received at the cooperative LMU is provided. Similarly, a second correlation map (311—see FIG. 3b) representing the correlation of the second reference signal ($\text{DPCCH}_{REF}$) with the signal received at the cooperative LMU is provided. In this example, these correlation maps are provided at the cooperative LMU. Here again, however, this step could be performed, e.g., at the SMLC.

S6: Based on the first correlation map, first and second peaks (305, 306—see FIG. 3a) are identified.

S7: Based on the second correlation map, third and fourth peaks (313, 314—see FIG. 3b) are identified.

S8: A first value corresponding to a ratio of the first and third peaks (305/313) is determined, and a second value corresponding to a ratio of the second and fourth peaks (306/314) is determined These values could be calculated as simple ratios of real numbers or could be based on mathematical functions which are equivalent in the context of the present invention (e.g., log(x)−log(y)=log (x/y)).

S9: The first and second values are compared to a third value based on the ratio of predetermined gain factors $\beta c/\beta d$. The SOI is identified based on the value most closely matching the third value.

As discussed above, once the SOI is correctly identified or isolated from the interference, the precise time of arrival can be determined and used in calculating the location of the target mobile device 101 (FIG. 1).

FIG. 4

Figure 4:
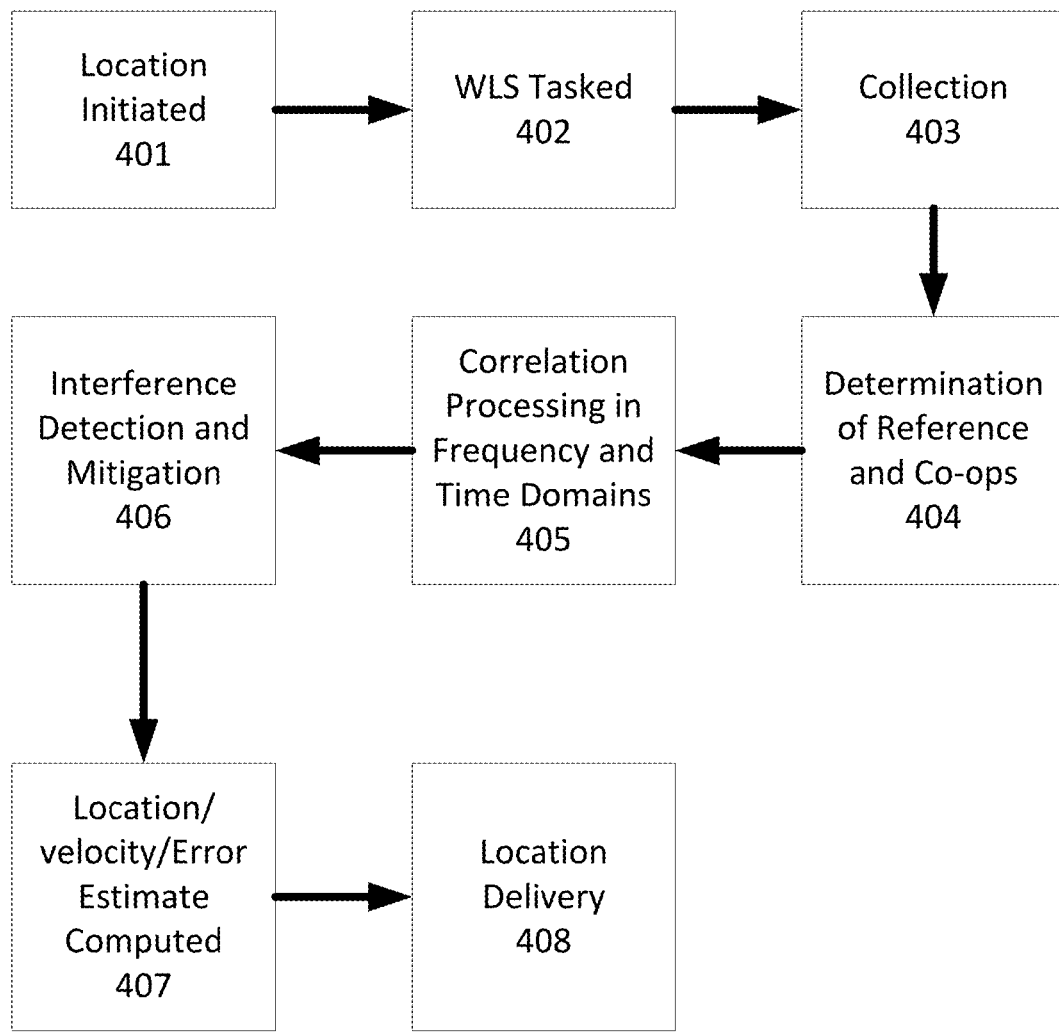
FIG. 4 depicts a procedure for interference detection and mitigation.

Interference detection and mitigation is one part of the overall location process. FIG. 4 illustrates the location process and the position of Interference detection and mitigation. A location request is initiated 401. This initiation may be originated at the mobile device, by wireless communications network or by another entity. The Wireless Location System must be tasked 402 to locate the mobile device, in this case a UTMS User Element or UE.

When the WLS is tasked 402 either by the associated wireless communications system or a triggering platform the WLS determines the LMU(s) best suited to detect the received signal and serve as the reference LMU. The WLS also determines which sites are good candidates for making timing and/or AoA measurements and the LMUs at these sites can act as cooperating LMUs. See U.S. Patent Application No. 20110159891, "Cooperating Receiver Selection for UMTS Wireless Location", Segal et al., filed Jun. 30, 2011 (hereby incorporated by reference) for additional detail on reference and cooperator selection in a UMTS network. Details of triggering platforms and tasking information, both control-plane and user plane based, can be found in U.S. Pat. No. 7,167,713, "Monitoring of Call Information in a Wireless Location System"; U.S. Pat. No. 6,782,264, "Monitoring of Call Information in a Wireless Location System"; U.S. patent application Ser. No. 11/150,414, "Advanced triggers for location-based service applications in a wireless location system"; and U.S. patent application Ser. No. 11/533,310, "User Plane Uplink Time Difference of Arrival (U-TDOA)".

While the UE of interest is on channel and transmitting, the WLS instructs the reference site LMU(s) and cooperating sites LMUs to collect 403 the transmitted uplink signal of interest over a synchronized time window. At each LMU path-loss attenuation, multi-path self-interference and corruption of the signal of transmitted signal-of-interest from other UE uplink transmissions is expected.

Once the WLS instructs the reference LMU(s) to detect the received signal, the cooperating site LMUs at simply collect the uplink signals and wait. Next, the reference LMU(s) extracts the signal-of-interest reference signal in an environment with relatively small levels of interference present in, or near, the serving UMTS cell. Once the collected SOI is despread and demodulated at the reference LMUs pre-selected by the WLS, an evaluation of the collected SOI and the final selection of a reference LMU can be made 404. At the reference LMU, the SOI is compressed into a representative reference signal. The reference signal and the reference LMU's time of arrival timestamp are then distributed to the cooperating LMUs.

The cross-correlation in the time and frequency domains 405 with the reference signal is then done at each the cooperating LMUs. At the cooperating LMUs the received signal is weak with potentially high levels of interference. Long integration lengths (relative to a symbol period) give the cooperating LMUs additional processing gain. The long integration lengths arise from using reference data that come from the entire normal transmission of data from the UE rather than only using a special predetermined signal for positioning. The long integration lengths help the cooperating LMUs extract a reliable timing estimate from the weak signal with relatively high levels of interference. See U.S. Pat. No. 5,327,144, "Cellular Telephone Location System", Jul. 5, 1994; U.S. Ser. No. 5,608,410, "System for Locating a Source of Bursty Transmissions," Mar. 4, 1997; and U.S. Pat. No. 5,959,580, "Communications Localization System," Sep. 28, 1999 (all incorporated herein by reference) for details of matched replica and cross-correlation processing.

To maximize the number of cooperating LMUs reporting timing, power, and/or angle information, an additional correlation processing step is performed to detect interfering UEs and mitigate the co-channel interference 406. The SOI is separated into its user data (DPDCH) and control (DPCCH) and then correlated separately with the local received signal. When the two correlation results are compared, the ratio of the correlation amplitudes (correlation of DPCCH signal/correlation of DPDCH signal) of the true SOI will approximate the ratio of the DPCCH power gain factor over the DPDCH power gain factor while that of an interfered signal will be greatly in excess of the same power gain factor ratio.

Lastly, the co-operating LMUs send the timing, power, and/or angle measurements to the WLS (e.g., SMLC) where the final mobile position, velocity and/or confidence factors are determined 407. The final location response is then sent back to the core network requestor 408.

CONCLUSION

The true scope the present invention is not limited to the presently preferred embodiments disclosed herein. For example, the foregoing disclosure of a presently preferred embodiment of a Wireless Location System uses explanatory terms, such as Location Measuring Unit (LMU), Serving Mobile Location Center (SMLC) and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. For example, the invention is not limited to systems employing LMU's as described above. The LMU's, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the base station) described herein to another functional element (such as the LMU) without changing the inventive operation of the system. In many cases, the place of implementation (i.e., the functional element) described herein is merely a designer's preference and not a hard requirement.

As described above, the disclosed invention may be alternatively embodied in an IS-2000/CDMA-2000 environment. Similar to the W-CDMA scheme used for UMTS, the CDMA-2000 protocol for the uplink radio signal (i.e., the reverse channel) contains a mix of common signaling (the reverse link pilot) and unique signaling (the user data channels). Knowledge of the reverse link pilot and collected user data channel information allows the WLS to cross-correlate the collected signal at an LMU with the reference signal to isolate and identify the signal from the to-be located mobile. The scope of protection of the following claims encompasses the embodiments designed for both UMTS and IS-2000/CDMA-2000, as will be appreciated by those skilled in the art. Accordingly, except as they may be expressly so limited, the scope of protection of the following claims is not intended to be limited to the specific embodiments described above.

What is claimed is:

1. A method for identifying a signal-of-interest (SOI), comprising:
receiving the SOI at a reference sensor station;
providing a first reference signal based on a first component of the SOI received at the reference sensor station, and a second reference signal based on a second component of the SOI received at the reference sensor station;
receiving a signal comprising the SOI along with an interfering signal at a cooperative sensor station;
correlating the first reference signal and the second reference signal with the signal received at the cooperative sensor station;
providing a first correlation map representing the correlation of the first reference signal with the signal received at the cooperative sensor station, and providing a second correlation map representing the correlation of the second reference signal with the signal received at the cooperative sensor station;
based on the first correlation map, identifying first and second peaks;
based on the second correlation map, identifying third and fourth peaks;
determining a first value corresponding to a ratio of the first and third peaks and determining a second value corresponding to a ratio of the second and fourth peaks;
comparing the first and second values to a third value based on a ratio of predetermined gain factors $\beta c/\beta d$; and
identifying the SOI based on the value most closely matching the third value.

2. The method recited in claim 1, further comprising determining a time of arrival of the SOI at the cooperative sensor station.

3. The method recited in claim 1, wherein the SOI includes a user data part and a control data part.

4. The method recited in claim 3, wherein the SOI is transmitted by a mobile device over dual uplink channels using a dual channel phase shift keying digital modulation method in which coded user data are applied to an in-phase input of a quadrature phase shift keying (QPSK) modulator and control data are applied to a quadrature-phase input of the QPSK modulator, thereby resulting in physical uplink channels including a Dedicated Physical Data Channel (DPDCH) and a Dedicated Physical Control Channel (DPCCH).

5. The method recited in claim 4, wherein the first reference signal, $DPDCH_{REF}$, is based on the user data part of the SOI received at the reference sensor station, and the second reference signal, $DPCCH_{REF}$, is based on the control data part of the SOI received at the reference sensor station.

6. The method of claim 1, wherein the reference sensor station comprises a first location measuring unit (LMU).

7. The method of claim 6, wherein the cooperative sensor station comprises a second LMU.

8. A method for identifying a signal-of-interest (SOI) having a user data part and a control data part, wherein the SOI is transmitted by a mobile device over dual uplink channels using a dual channel phase shift keying digital modulation method in which coded user data are applied to an in-phase input of a quadrature phase shift keying (QPSK) modulator and control data are applied to a quadrature-phase input of the QPSK modulator, thereby resulting in physical uplink channels including a Dedicated Physical Data Channel (DPDCH) and a Dedicated Physical Control Channel (DPCCH), the method comprising:
receiving the SOI at a first, reference location measuring unit (LMU);
providing a first reference signal ($DPDCH_{REF}$) based on the user data part of the SOI received at the reference LMU, and a second reference signal ($DPCCH_{REF}$) based on the control data part of the SOI received at the reference LMU;
receiving a signal comprising the SOI along with an interfering signal at a second, cooperative LMU;
correlating the first reference signal, $DPDCH_{REF}$, and the second reference signal, $DPCCH_{REF}$, with the signal received at the cooperative LMU;
providing a first correlation map representing the correlation of the first reference signal, $DPDCH_{REF}$, with the signal received at the cooperative LMU, and providing a second correlation map representing the correlation of the second reference signal, $DPCCH_{REF}$, with the signal received at the cooperative LMU;
based on the first correlation map, identifying first and second peaks;
based on the second correlation map, identifying third and fourth peaks;
determining a first value corresponding to a ratio of the first and third peaks and determining a second value corresponding to a ratio of the second and fourth peaks;
comparing the first and second values to a third value based on a ratio of predetermined gain factors $\beta c/\beta d$, wherein the SOI is identified based on the value most closely matching the third value; and
determining a time of arrival of the SOI at the cooperative LMU.

9. The method recited in claim 8, wherein the method is carried out as part of an interference detection and mitigation process employed by a wireless location system (WLS).

10. The method recited in claim 9, wherein the interference detection and mitigation process is part of an overall process comprising the following:
a location request is initiated by the mobile device or a wireless communications network associated with the mobile device or WLS;
the WLS is tasked to locate the mobile device;
the WLS determines one or more LMUs suited to detect the received signal and serve as a reference LMU;
the WLS determines which LMUs are candidates for making timing measurements and functioning as cooperative LMUs;
while the mobile device is transmitting, the WLS instructs candidate reference LMU(s) and cooperative LMUs to collect a transmitted uplink SOI over a synchronized time window;
the candidate reference LMU(s) extracts the SOI reference signal in an environment with relatively small levels of interference present;

once the collected SOI is de-spread and demodulated at the candidate reference LMU(s), an evaluation of the collected SOI and the final selection of a reference LMU is made;

at the reference LMU, the SOI is compressed into a representative reference signal, and the reference signal and a reference LMU time of arrival timestamp are distributed to the cooperative LMUs;

cross-correlation in time and frequency domains with the reference signal is carried out at each cooperative LMU;

the interference detection and mitigation process is carried out;

the cooperative LMUs send timing measurements to the WLS where final mobile device position, velocity and/or confidence factors are determined; and a final location response is sent back to the requestor.

11. A system for identifying a signal-of-interest (SOI), comprising:

a reference sensor station configured to receive the SOI and to provide a first reference signal based on a first component of the SOI and a second reference signal based on a second component of the SOI;

a cooperative sensor station configured to receive a signal comprising the SOI along with an interfering signal, and to correlate the first reference signal and the second reference signal with the signal received at the cooperative sensor station; and means for identifying the SOI based on a ratio of predetermined gain factors ($\beta c/\beta d$) and the correlations of the first and second reference signals with the signal received at the cooperative sensor station.

12. The system recited in claim 11, wherein the means for identifying the SOI comprises:

means for providing a first correlation map representing the correlation of the first reference signal with the signal received at the cooperative sensor station, and providing a second correlation map representing the correlation of the second reference signal with the signal received at the cooperative sensor station;

means for identifying first and second peaks based on the first correlation map;

means for identifying third and fourth peaks based on the second correlation map;

means for determining a first value corresponding to a ratio of the first and third peaks and determining a second value corresponding to a ratio of the second and fourth peaks;

means for comparing the first and second values to a third value based on a ratio of predetermined gain factors $\beta c/\beta d$; and means for identifying the SOI based on the value most closely matching the third value.

13. A non-transitory computer readable medium, comprising instructions for performing a computer-implemented process, comprising:

instructions for receiving a signal-of-interest (SOI) at a reference sensor station;

instructions for providing a first reference signal based on a first component of the SOI received at the reference sensor station, and a second reference signal based on a second component of the SOI received at the reference sensor station;

instructions for receiving a signal comprising the SOI along with an interfering signal at a cooperative sensor station;

instructions for correlating the first reference signal and the second reference signal with the signal received at the cooperative sensor station;

instructions for providing a first correlation map representing the correlation of the first reference signal with the signal received at the cooperative sensor station, and providing a second correlation map representing the correlation of the second reference signal with the signal received at the cooperative sensor station;

instructions for identifying first and second peaks;

instructions for identifying third and fourth peaks;

instructions for determining a first value corresponding to a ratio of the first and third peaks and determining a second value corresponding to a ratio of the second and fourth peaks;

instructions for comparing the first and second values to a third value based on a ratio of predetermined gain factors $\beta c/\beta d$; and instructions for identifying the SOI based on the value most closely matching the third value.

14. A method for identifying a signal-of-interest (SOI), wherein the SOI includes a user data part and a control data part, comprising:

providing a first reference signal based on the user data part of the SOI and a second reference signal based on the control data part of the SOI;

correlating the first reference signal and the second reference signal with an interference-corrupted signal comprising the SOI along with an interfering signal;

providing a first correlation map representing the correlation of the first reference signal with the interference-corrupted signal, and providing a second correlation map representing the correlation of the second reference signal with the interference-corrupted signal;

based on the first correlation map, identifying first and second peaks;

based on the second correlation map, identifying third and fourth peaks;

determining a first value corresponding to a ratio of the first and third peaks and determining a second value corresponding to a ratio of the second and fourth peaks;

comparing the first and second values to a third value based on a ratio of predetermined gain factors $\beta c/\beta d$; and identifying the SOI based on the value most closely matching the third value.

15. The method recited in claim 14, further comprising determining a time of arrival of the SOI at a cooperative sensor station.

16. The method recited in claim 14, wherein the SOI is transmitted by a mobile device over dual uplink channels using a dual channel phase shift keying digital modulation method in which coded user data are applied to an in-phase input of a quadrature phase shift keying (QPSK) modulator and control data are applied to a quadrature-phase input of the QPSK modulator, thereby resulting in physical uplink channels including a Dedicated Physical Data Channel (DPDCH) and a Dedicated Physical Control Channel (DPCCH).

17. The method recited in claim 16, wherein the first reference signal, $DPDCH_{REF}$, is based on the user data part of the SOI received at a reference sensor station, and the second reference signal, $DPCCH_{REF}$, is based on the control data part of the SOI received at the reference sensor station.

* * * * *